United States Patent
Kang

(10) Patent No.: US 8,085,713 B2
(45) Date of Patent: Dec. 27, 2011

(54) RESOURCE ALLOCATION METHOD OF SUBSCRIBER OF SERVICE NEGOTIATION SYSTEM

(75) Inventor: Chia-Feng Kang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1003 days.

(21) Appl. No.: 12/022,125

(22) Filed: Jan. 29, 2008

(65) Prior Publication Data

US 2008/0240059 A1    Oct. 2, 2008

(30) Foreign Application Priority Data

Mar. 27, 2007 (TW) ............................... 96110482 A

(51) Int. Cl.
*H04W 4/00* (2009.01)
(52) U.S. Cl. .... 370/328; 370/341; 370/346; 370/395.21
(58) Field of Classification Search .................. 370/230, 370/230.1, 232, 233, 235, 252, 328, 329, 370/346, 341, 395.21
See application file for complete search history.

(56) References Cited

U.S. PATENT DOCUMENTS

| | | | |
|---|---|---|---|
| 6,400,699 B1 | 6/2002 | Airy et al. | |
| 6,807,193 B1 * | 10/2004 | Beser | 370/498 |
| 6,977,919 B1 | 12/2005 | Stanwood | |
| 7,016,317 B1 | 3/2006 | Pathak et al. | |
| 2003/0152201 A1 | 8/2003 | Snelgrove et al. | |
| 2004/0057531 A1 * | 3/2004 | Rooyen et al. | 375/267 |
| 2004/0185835 A1 | 9/2004 | Preiss et al. | |
| 2005/0267743 A1 * | 12/2005 | Gerlach | 704/221 |
| 2006/0146863 A1 * | 7/2006 | Spinar et al. | 370/449 |
| 2007/0147341 A1 * | 6/2007 | Izumikawa et al. | 370/351 |

FOREIGN PATENT DOCUMENTS

| | | |
|---|---|---|
| EP | 1294203 | 3/2003 |
| WO | 2006115391 | 11/2006 |

* cited by examiner

*Primary Examiner* — Hassan Kizou
*Assistant Examiner* — Toan Nguyen
(74) *Attorney, Agent, or Firm* — Jianq Chyun IP Office

(57) ABSTRACT

A resource allocation method of a subscriber station in a service negotiation system is provided. The resource allocation method includes gathering statistics of bursty data, bandwidth grant situation, and measuring wireless signal quality. The subscriber station switches its operation mode according to the statistics and bandwidth data derived by the signal measurement. When the subscriber station in a wireless system switches into a normal operation mode, it allocates bandwidth to management message and numbers of data connections to satisfy the quality of service (QoS) of each connection. When the subscriber station in a wireless system switches into an emergency operation mode, it allocates bandwidth to management message and unsolicited grant service (UGS).

25 Claims, 11 Drawing Sheets

RESOURCE ALLOCATION METHOD OF SUBSCRIBER OF SERVICE NEGOTIATION SYSTEM

CROSS-REFERENCE TO RELATED APPLICATION

This application claims the priority benefit of Taiwan application serial no. 96110482, filed on Mar. 27, 2007. The entirety of the above-mentioned patent application is hereby incorporated by reference herein and made a part of this specification.

BACKGROUND OF THE INVENTION

1. Field of the Invention

The present invention relates to a service negotiation system. More particularly, the present invention relates to a resource allocation method of a subscriber station in a service negotiation system.

2. Description of Related Art

As a wireless network is getting more and more popular, many subscriber station (SS) devices can be connected to Internet by the use of wireless network devices. Apparently, currently available notebook computers on the market usually have built-in wireless network cards (for example, Centrino). Further, the subscriber station in third generation (3G) can also access the network through services provided by service providers by the use of mobile phones.

As for WLAN specification IEEE 802.11 (Wireless Fidelity, WiFi), the most popular specification in the packet-switching network that can effectively utilize Internet resources, QoS can not be clearly provided directing to a certain subscriber device or service. Though the wireless broadband network specification IEEE 802.16 (Worldwide Interoperability for Microwave Access, WiMAX) which is frequently discussed currently defines different QoS parameter/service scheduling parameters based on the protocol of the specification, generally only the names and definitions of these parameters are specified, and no suggestion solutions are provided on how to use these parameters, among which the scheduling is the most important.

SUMMARY OF THE INVENTION

The present invention provides a resource allocation method of a subscriber station in a service negotiation system, which is directed to QoS parameter/service scheduling parameters provided by the service negotiation system, and taking the actual subscriber station's environment into consideration, can ensure a certain QoS of data transmission of a subscriber station and effectively utilize a wireless network bandwidth to transmit UGS or most basic management messages under the circumstances that the quality is poor and the wireless network environment is deteriorated, thus saving wireless resources.

The present invention provides a subscriber station in a service negotiation system, which is directed to QoS parameter/service scheduling parameters provided by the service negotiation system, and taking the actual subscriber station's environment into consideration, can guarantee certain QoS of data transmission of subscriber station, effectively avoid a waste of wireless network bandwidth, and even transmit UGS or the most basic management messages under the circumstances that the quality is poor and the wireless network environment is deteriorated, thus making full use of wireless resources.

The present invention provides a resource allocation method of a subscriber station in a service negotiation system applied to wireless network. The resource allocation method includes gathering statistics of bursty data, measuring wireless signal quality to obtain a measuring result, and switching the operation mode according to the statistics of bursty data and the measuring result. When the subscriber station in the service negotiation system switches its operation mode to a normal operation mode, it distributes bandwidth to management message and a plurality of connections to satisfy the requirement of the QoS of each connection. When the subscriber station in the service negotiation system switches its operation mode to an emergency operation mode, it allocates the granted bandwidth to management message and UGS. The method of bandwidth granting includes unsolicited bandwidth grant, a mechanism for the subscriber station to stop dynamic bandwidth request, and remedial method for the situation of stopping of bandwidth granting, which is established and determined at the stage of initialization of the subscriber station.

From another point of view, the present invention provides a subscriber station in a service negotiation system. The subscriber station includes service data unit (SDU) buffer, MAP receiver, bandwidth allocation unit, protocol data unit (PDU) constructor, burst interface, media access control (MAC) manager, and modulation/demodulation unit. The SDU buffer registers the data packets output by the upper-layer unit and MAC manager. The MAP receiver receives and decodes a MAP from the base station (BS). The bandwidth allocation unit is coupled to the MAP decoder for allocating bandwidth to each connection according to the decoding result of the MAP. The PDU constructor is coupled to the bandwidth allocation unit and the SDU buffer for reading data of each connection from the SDU buffer to establish a PDU according to the bandwidth allocation result of each connection. The burst interface is coupled to the PDU constructor for registering the PDU output by the PDU constructor, and outputting the registered content during an allocated time. The MAC manager manages the protocol management message communicated with the BS, and regulates the operation setting of the subscriber station according to the message exchange result. The modulation/demodulation unit is coupled to the burst interface and the MAP receiver for providing a signal modulation/demodulation interface between the subscriber station and the BS, and modulating the data output by the burst interface and transmitting it to the BS.

The subscriber station further gathers statistics of bursty data and measures wireless signal quality, and the bandwidth allocation unit switches its operation mode according to the statistics and bandwidth data derived by the signal measurement. When the subscriber station switches its operation mode into a normal operation mode, the bandwidth allocation unit allocates bandwidth to management message and numbers of connections to satisfy the QoS of each connection. When the subscriber station switches its operation mode into an emergency operation mode, the bandwidth allocation unit allocates bandwidth to management message and UGS.

In the present invention, the operation mode is switched according to the statistics and bandwidth data derived by the signal measurement (for example, when the subscriber station in the service negotiation system switches its operation mode into a normal operation mode, it allocates bandwidth to management message and numbers of connections to satisfy the QoS of each connection; and when the subscriber station in the service negotiation system switches its operation mode into an emergency operation mode, it allocates bandwidth to management message and UGS).

In order to make the aforementioned features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Conventional scheduler architectures and algorithms of wired network and wireless network cannot guarantee clearly QoS effect for each data flow besides an integrated service request for comments (IntServ RFC) of the Internet engineering task force (IETF). Directed to the above phenomenon, the WiMAX specification provides QoS parameter/service scheduling parameter and their definitions of usage at the wireless network for reference in practice.

However, as for the architecture of the entire scheduler, the design of devices of SS/local station and BS/network station is out of scope, and the integrality of practices of the two stations only simply uses specified items listed in the communication protocol implementation conformance statement (PICS), thus leaving a large space on practice and performance.

The SS/local station device scheduling work defined by the WiMAX system not only includes uplink grant scheduling, but also includes uplink bandwidth request scheduling. The above two operations have clear definitions in the specifications of IEEE 802.16 and WiMAX Form. According to the following embodiments, those of ordinary skill in the art can design and implement SS/local station scheduler to meet the request on scheduling characteristics of demand assigned multiple access (DAMA) in the specification. The present invention is illustrated by the following embodiments.

Figure 1:
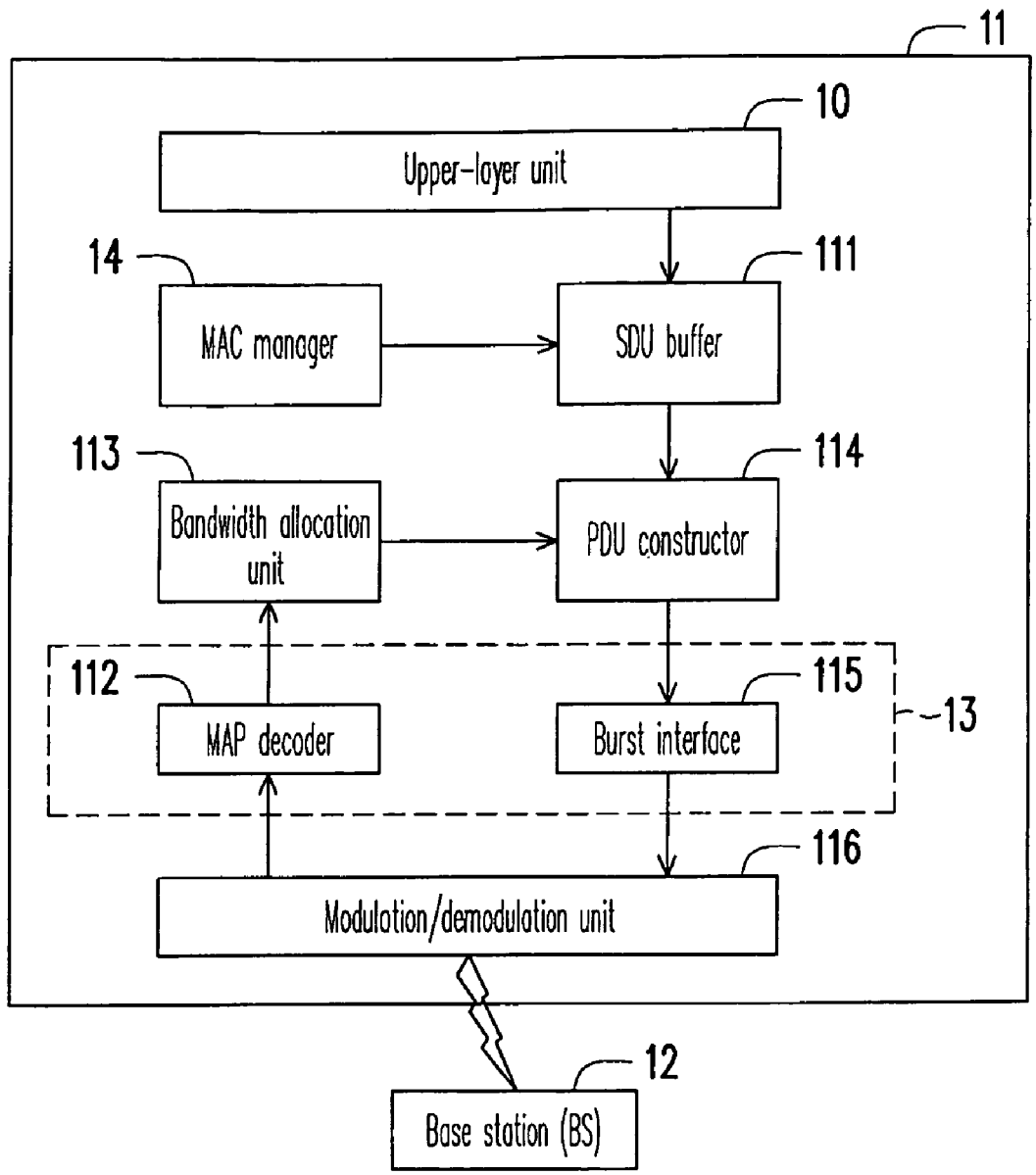
FIG. 1 shows a subscriber station in a service negotiation system according to an embodiment of the present invention.

FIG. 1 shows a subscriber station in a service negotiation system according to an embodiment of the present invention. As shown in FIG. 1, the subscriber station 11 includes an upper-layer unit 10, an SDU buffer 111, a bandwidth allocation unit 113, a PDU constructor 114, a modulation/demodulation unit 116, a software/hardware communication interface 13, and an MAC manager 14. The software/hardware communication interface 13 mainly includes elements such as an MAP decoder 112 and a burst interface 115, and is used as an interface responsible for communication between the software portions (for example, the upper-layer unit 10, SDU buffer 111, bandwidth allocation unit 113, PDU constructor 114) and the hardware portions (for example, modulation/demodulation unit 116) of the subscriber station in this embodiment. The subscriber station 11 communicates with the BS 12 through the modulation/demodulation unit 116 and other relevant means (for example, antenna, which is not shown in the figure).

The SDU buffer 111 registers data packets output by the upper-layer unit 10 and management message output by the MAC manager 14. The MAP decoder 112 receives and decodes an MAP from the BS 12. The bandwidth allocation unit 113 allocates bandwidth to each connection according to the decoding result of the MAP decoder 112. The PDU constructor 114 reads data of each connection from the SDU buffer 111 to establish a PDU according to the bandwidth allocation result of each connection provided by the bandwidth allocation unit 113. The burst interface 115 registers the PDU output by the PDU constructor 114, and outputs the registered content during an allocated time. The modulation/demodulation unit 116 provides a signal modulation/demodulation interface between the subscriber station 11 and the BS 12, and modulates data output by the burst interface and transmits it to the BS 12.

The subscriber station 11 further gathers statistics of bursty data and measures wireless signal quality, and the bandwidth allocation unit 113 switches its operation mode according to the statistics and bandwidth data derived by the signal measurement. When the subscriber station 11 switches its operation mode into a normal operation mode, the bandwidth allocation unit 113 allocates bandwidth to management message and numbers of connections to satisfy the QoS of each connection. When the subscriber station 11 switches its operation mode into an emergency operation mode, the bandwidth allocation unit 113 allocates bandwidth to management message and UGS.

Figure 2:
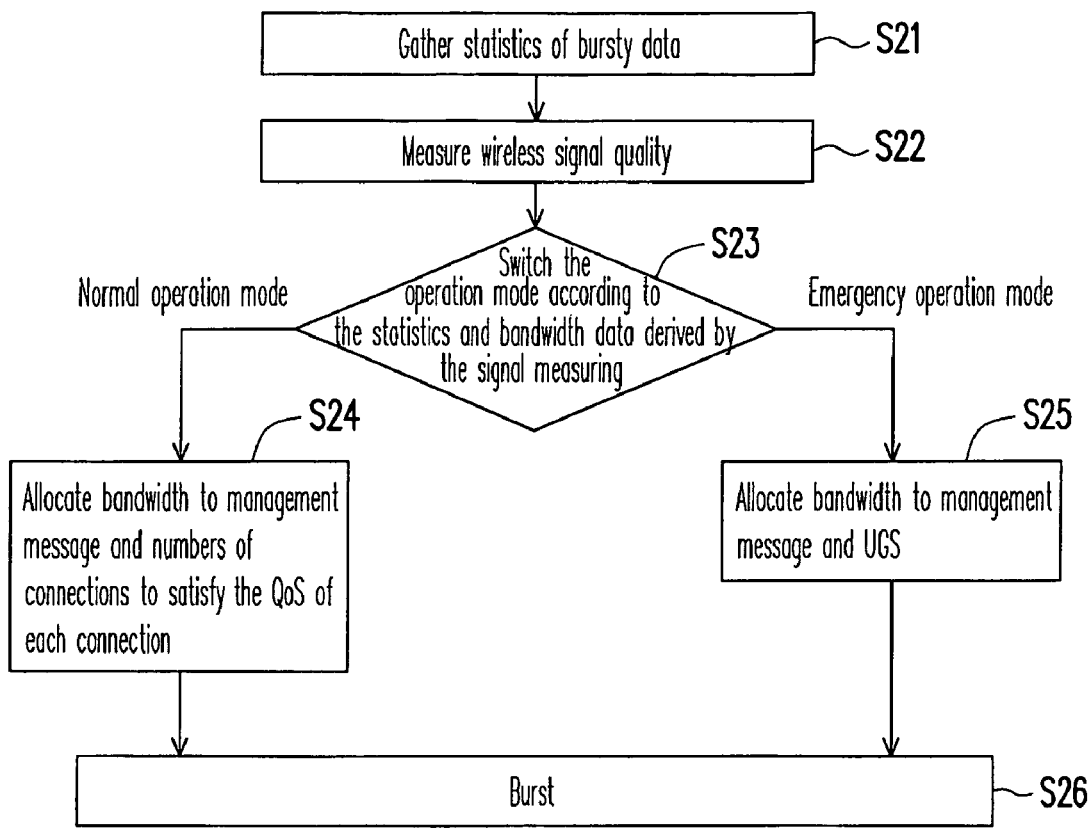
FIG. 2 is a flow chart of processes of a resource allocation method of a subscriber station in a service negotiation system according to an embodiment of the present invention.

FIG. 2 is a flow chart of the processes of a resource allocation method of a subscriber station in a service negotiation system according to an embodiment of the present invention. Referring to the embodiment in FIG. 1, the subscriber station 11 first performs Step S21 to gather statistics of bursty data, and then performs Step S22 to measure wireless signal quality. In Step S23, the subscriber station 11 switches its operation mode according to the statistics obtained in Step S21 and bandwidth data derived by the signal measurement in Step S22. When the subscriber station in the service negotiation system switches its operation mode into a normal operation mode, the bandwidth allocation unit 113 allocates bandwidth to management message and numbers of connections to satisfy the QoS of each connection (Step S24).

When the subscriber station in the service negotiation system switches its operation mode into an emergency operation mode, the bandwidth allocation unit 113 allocates the active grant bandwidth to management message and UGS (Step S25). Finally, the subscriber station 11 performs burst to output the content registered in the burst interface 115 to the BS 12 (Step S26).

The above method of actively granting bandwidth can be any method for the BS 12 to actively grant bandwidth to the subscriber station 11 (for example, unsolicited bandwidth grant, the mechanism for the subscriber station to stop dynamic bandwidth request, and remedial method for the situation of stopping of automatically granting bandwidth). The method of actively granting bandwidth is established and determined at the stage of initialization of the subscriber station. The method of actively granting bandwidth includes after the subscriber station 11 finishes the stage of network entry, establishing a subscriber station-defined connection with the BS 12, in which the parameters of the subscriber station-defined connection include at least an active grant bandwidth granularity and an active grant bandwidth value. Before entering the emergency mode, the parameters of the subscriber station-defined connection are altered similar to the connection setting of UGS to operate normally in the emergency mode.

When the BS 12 intends to suspend or break the subscriber station-defined connection, the subscriber station 11 immediately generates a connection (another subscriber station-defined connection) having the same parameter values and scopes as the original active grant connection through contention-based bandwidth request and re-establishing connection. In the emergency mode, the connection transmission permitted by the subscriber station 11 depends on the active grant bandwidth transmission, and the dynamic bandwidth request mechanism of each connection is stopped. The setting of the data transmission of each connection does not disobey the QoS parameter.

Although the above embodiments have described some possible forms of the subscriber station in the service negotiation system and the resource allocation method of the subscriber station in the service negotiation system, those of ordinary skill in the art would understand that each manufacturer has a different design of the SDU buffer 111, MAP decoder 112, bandwidth allocation unit 113, PDU constructor 114, burst interface 115, modulation/demodulation unit 116, and even the subscriber station 11. Thus, the application of the present invention may not be limited to the above-mentioned possible forms.

Moreover, those of ordinary skill in the art would understand that in Step S22 of measuring the signal quality of the service negotiation system, the QoS parameter/service scheduling parameter provided by the service negotiation system and the actual circumstances of the subscriber station's environment can be measured. For example, indexes, such as received signal strength indicator (RSSI) and carrier to interference plus noise ratio (CINR) are measured, and the details will not be described herein.

In other words, the subscriber station 11 can switch its operation mode according to the statistics of bursty data and bandwidth data derived by the signal measurement for wireless signal quality. It conforms to the spirit of the present invention as long as the subscriber station 11 switches its operation mode into a normal operation mode, it allocates bandwidth to management message and numbers of connections to satisfy the QoS of each connection; and when the subscriber station 11 switches its operation mode into an emergency operation mode, it allocates bandwidth to management message and UGS.

Figure 3:
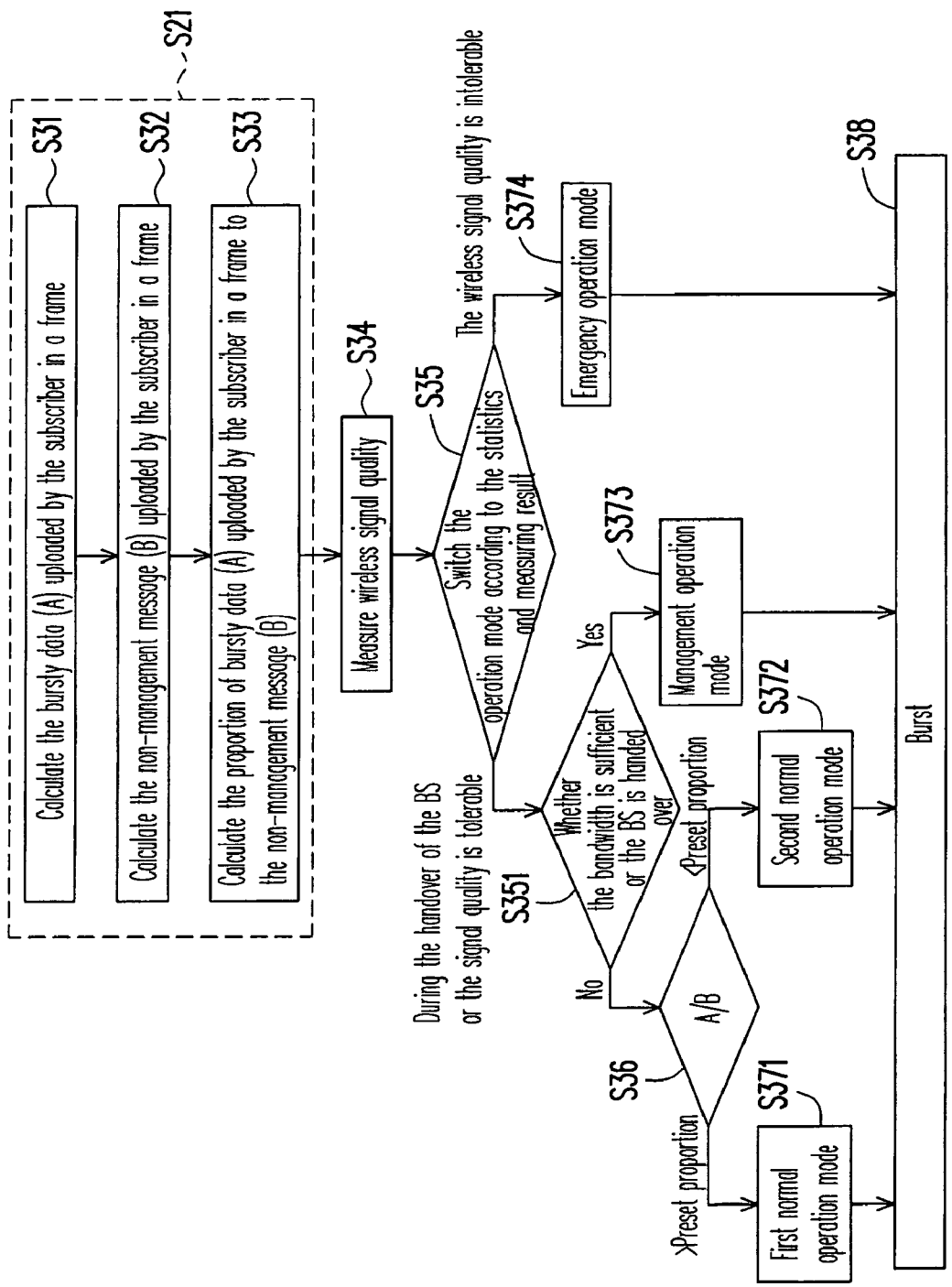
FIG. 3 is a flow chart of processes of a resource allocation method of a subscriber station in a service negotiation system according to another embodiment of the present invention.

In order to make those of ordinary skill in the art to further understand the spirit of the present invention, another embodiment will be illustrated below. FIG. 3 is a flow chart of the processes of a resource allocation method of a subscriber station in a service negotiation system according to another embodiment of the present invention. Referring to FIG. 1 and FIG. 3 together, Step S31-S33 are detailed operating methods of Step S21 in FIG. 2. The subscriber station 11 first performs Step S31 to calculate the data (i.e., bursty data amount, indicated by A) of real-time polling service (rtPS) and non-real-time polling service (nrtPS) transmitted by the subscriber station 11 in a frame. Then, the subscriber station 11 performs Step S32 to calculate the non-management message data (indicated by B) transmitted by the subscriber station 11 in a frame. Afterwards, the subscriber station 11 performs Step S33 to calculate the continuous statistic value of the proportion (i.e., A/B) of bursty data uploaded by the subscriber station 11 in a frame to the non-management message data. After Step S34 of measuring wireless signal quality, the subscriber station 11 switches its operation mode according to the statistics and bandwidth data derived by the signal measurement (Step S35).

In Step S351, the subscriber station 11 determines whether the bandwidth allocated by the BS 12 to the subscriber station 11 is sufficient, and meanwhile determines whether the subscriber station 11 hands over the base station. When the wireless signal quality is tolerable, the bandwidth allocated by the BS 12 to the subscriber station 11 is sufficient, and the subscriber station 11 does not hand over the BS, the subscriber station 11 switches its normal operation mode according to the proportion (i.e., A/B) of the bursty data to the non-management message data obtained in Step S33 (Step S36). When the proportion of the bursty data to the non-management message data exceeds a preset value (for example, 60%), the subscriber station 11 switches its operation mode into a first normal operation mode (Step S371). When the proportion of the bursty data to the non-management message data is below a preset value (for example, 60%), the subscriber station 11 performs Step S372 to switch its operation mode into a second normal operation mode. The above-mentioned "preset proportion" can be a fixed value according to the requirements of the system, or a time-varying value dynamically regulated according to the course of transmission.

In Step S351, if it is determined that the wireless signal quality is tolerable, but the bandwidth allocated by the BS 12 to the subscriber station 11 is insufficient, or the subscriber station 11 hands over the BS, or the subscriber station 11 can only function on the basic protocol requirements, the subscriber station 11 switches its operation mode to the management operation mode (Step S373). If the wireless signal quality is intolerable, the subscriber station 11 performs Step S374 to switch to the emergency operation mode. Finally, the subscriber station 11 performs Step S38 to burst the ready data packets to the BS 12. Steps S371, S372, S373, and S374 will be illustrated in detail below.

Here, the wireless signal quality and the bandwidth required by the subscriber station 11 can be adjusted based on the actual product design and relevant actions and specifications. Further, the embodiment in FIG. 3 has described some more possible forms for the subscriber station in service negotiation system and the resource distributing method of a subscriber station in a service negotiation system. However, those of ordinary skill in the art should understand that the operation modes switched in Step S35 can be freely switched according to the changes of the environment of the service negotiation system. Therefore, the application of the present invention may not be limited to the above-mentioned possible forms.

Figure 4:
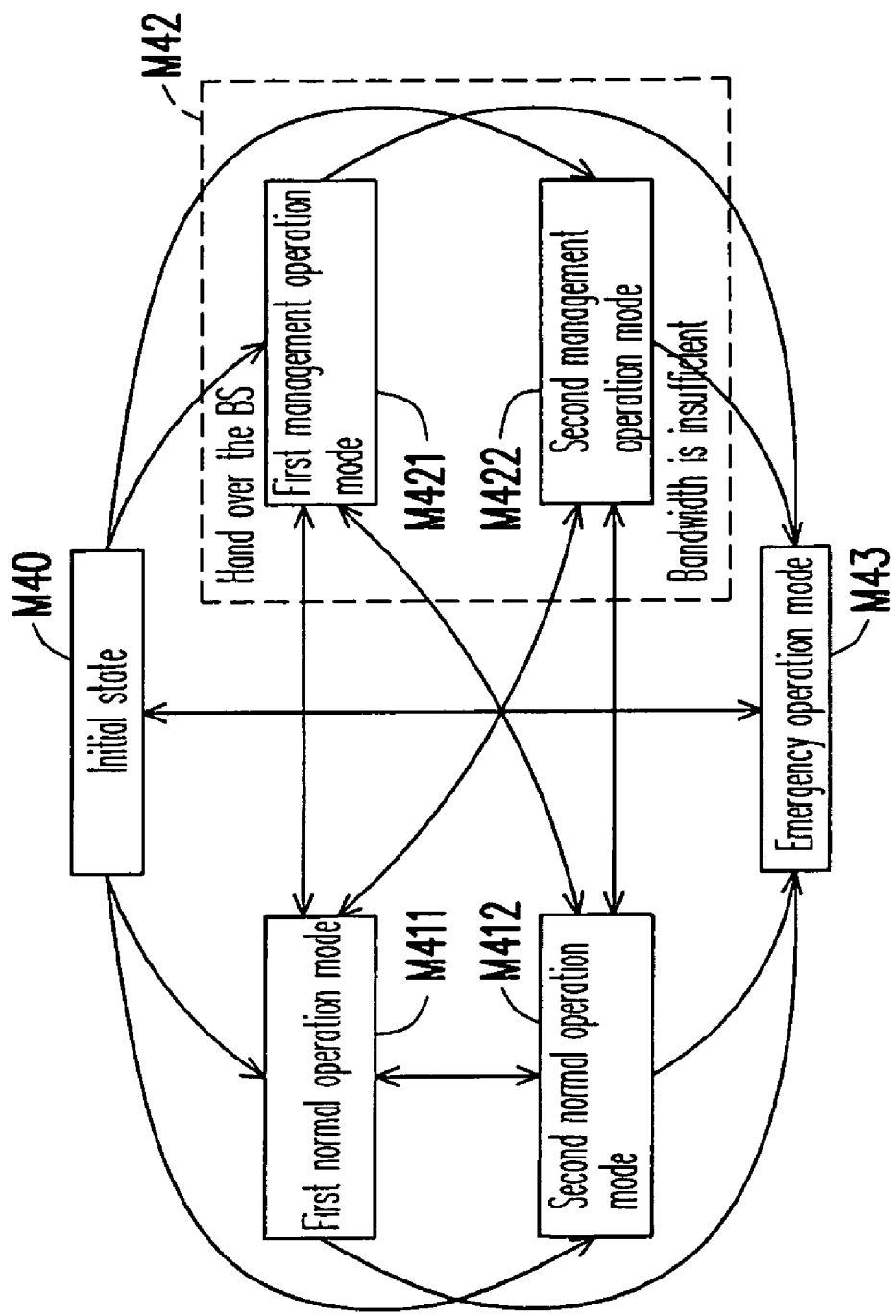
FIG. 4 is a state diagram/finite state machine of operation modes of a resource allocation method of a subscriber station in a service negotiation system according to another embodiment of the present invention.

For example, FIG. 4 is a state diagram of the operation modes of a resource distributing method of a subscriber station in a service negotiation system according to another embodiment of the present invention. The operation modes of the subscriber station in this embodiment include an initial mode M40, a first normal operation mode M411, a second normal operation mode M412, a management operation mode M42, and an emergency operation mode M43. The management operation mode M42 can be further divided into a first management operation mode M421 and a second management operation mode M422. The difference between the two management modes will be illustrated in detail below.

From the initial state M40, the subscriber station in this embodiment switches its operation mode into any mode of M411, M412, M42, M43 according to the statistics and bandwidth data derived by the signal measurement. It is assumed that the current environment of the service negotiation system is good, and the system switches its operation mode into the first normal operation mode M411. As time flies, the environment of the service negotiation system suddenly changes, though the wireless signal quality is still tolerable, the bandwidth allocated by the BS is insufficient for the subscriber station 11. At this time, the subscriber station 11 can switch into the second management operation mode M422. However, the environment of the service negotiation system gets worse, and the wireless signal quality degrades below the tolerable range. Then, the subscriber station in this embodiment will switch into the emergency operation mode M43 to transmit only the most basic management messages and effective UGS, thus saving wireless resources.

If the subscriber station 11 hands over the BS (however, the wireless signal quality is still tolerable), the subscriber station 11 switches its operation mode into the first management operation mode M421. As time flies, the environment of the service negotiation system gets better (for example, the handover of the BS is done), so the subscriber station 11 can switch into the first normal operation mode M411 or the second normal operation mode M412 according to the proportion (i.e., A/B) of the bursty data to the non-management message data. For example, if A/B is smaller than the preset proportion (for example, 60%), the subscriber station 11 of this embodiment will switch into the second normal operation mode M412. If the environment of the service negotiation system is suddenly deteriorated, the wireless signal quality degrades below the tolerable range. At this time, the subscriber station 11 can only switch into the emergency operation mode M43 to maintain the transmission of the most basic management messages. After the environment of the service negotiation system gets better (the wireless signal quality rises back into the tolerable range), the subscriber station 11 switches back into the initial state M40, and again switches into any mode of M411, M412, M42, M43 according to the statistics and bandwidth data derived by the signal measurement.

In order to make the content of the present invention more apparent, the implementation of each Step S371, S372, S373, and S374 (or each operation mode M411, M412, M42, M43) is illustrated in detail below as an example of the implementation of the present invention. Those of ordinary skill in the art would understand that some variations and modifications can be made to the embodiments of the present invention described above. The present invention can also be applied to the resource distributing of a subscriber station of a service negotiation system for saving network resources, and this may be described in detail below. The illustration of the drawings below is made with reference to FIG. 3 and FIG. 4 as required.

Figure 5:
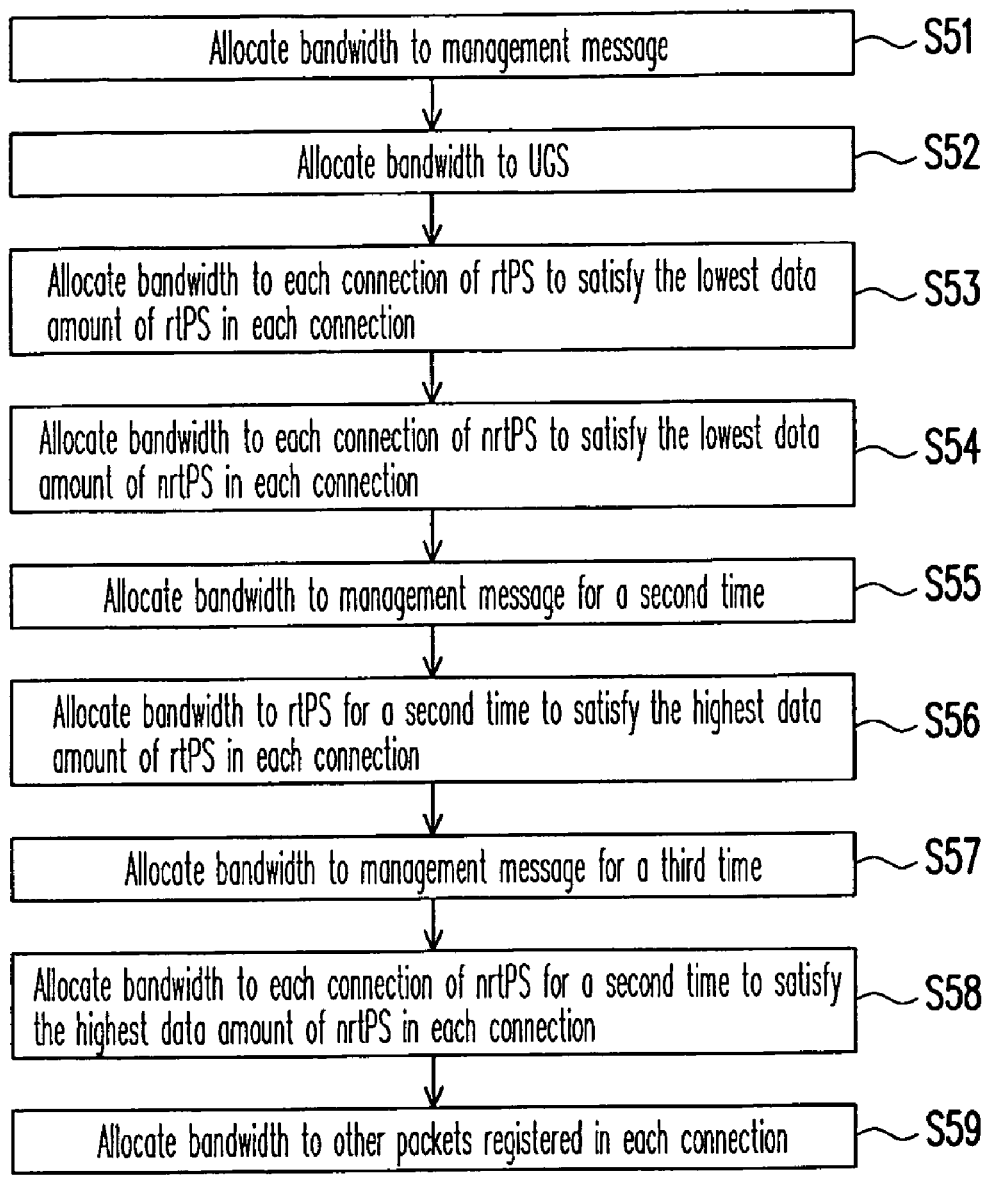
FIG. 5 is a flow chart of a first normal operation mode according to the embodiment of FIG. 4 of the present invention.
Figure 6:
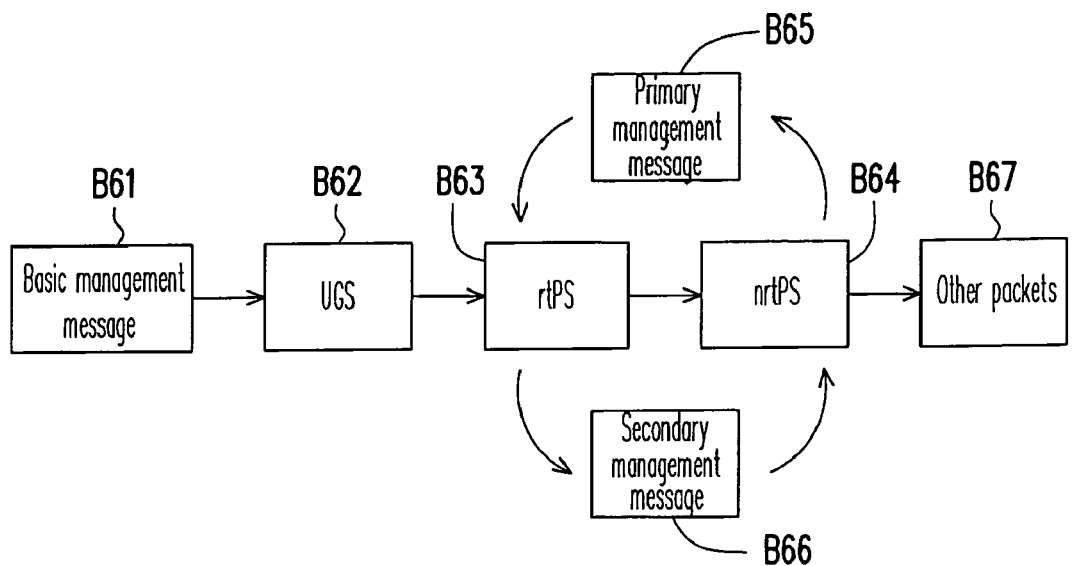
FIG. 6 is a state diagram of bandwidth allocation according to the embodiment of FIG. 5 of the present invention.

FIG. 5 is a detailed flow chart of the first normal operation mode M411 (or Step S371 of FIG. 3) according to the embodiment of FIG. 4 of the present invention. FIG. 6 is a state diagram of bandwidth allocation according to the embodiment of FIG. 5 of the present invention. After Step S371 of switching into the first normal operation mode, the bandwidth allocation unit 113 of the subscriber station 11 performs Step S51 to allocate bandwidth to management message (i.e., the state B61 in FIG. 6). The above step only allocates bandwidth to ranging request (RNG-REQ) message and basic management message, and the primary management message and secondary management message are processed in Step S55 or S57.

Those of ordinary skill in the art would understand the usage of RNG-REQ message and classification of management message. For example, the secondary management message includes dynamic host configuration protocol (DHCP) message, simple network management protocol (SNMP) message, and so on, which will not be described herein again.

Next, the bandwidth allocation unit 113 of the subscriber station 11 performs Step S52 to allocate bandwidth to UGS (i.e., the state B62 in FIG. 6). Usually, voice service is a kind of "UGS". Then, the bandwidth allocation unit 113 of the subscriber station 11 performs Step S53 to allocate bandwidth to each connection of rtPS (i.e., the state B63 in FIG. 6) to satisfy a lowest guaranteed data amount of rtPS in each connection. After Step S53, if no bandwidth is available, Steps S54-S59 are skipped and Step S38 (FIG. 3) is executed, i.e., bursting the ready data packets to the BS 12. If there is still bandwidth available, Step S54 is executed. That is, the bandwidth allocation unit 113 allocates bandwidth to each connection of nrtPS (i.e., the state B64 in FIG. 6) to satisfy a lowest guaranteed data amount of nrtPS in each connection. Generally, "rtPS" includes connection services for sending the message in real time, such as video service; while "nrtPS" includes connection services for sending the message which are not required to be sent in real time, such as file transmission.

After Step S54, if no bandwidth is available, Steps S55-S59 are skipped and Step S38 (in FIG. 3) is executed, i.e., burst the ready data packets to the BS 12. If there is still bandwidth available, Step S55 is executed. In Step S55, the bandwidth allocation unit 113 of the subscriber station 11 allocates bandwidth to management message (i.e., the state B65 in FIG. 6) for a second time. In Step S55, the bandwidth is allocated to the primary management message. After Step S55, if no bandwidth is available, Steps S56-S59 are skipped and Step S38 (in FIG. 3) is executed. If there is still bandwidth available, Step S56 is performed to allocate bandwidth to rtPS (i.e., the state B63 in FIG. 6) for a second time. In Step S56, the bandwidth allocated to each connection of rtPS cannot exceed the highest threshold data amount.

After Step S56, if no bandwidth is available, Steps S57-S59 are skipped and Step S38 (in FIG. 3) is executed. If there is still bandwidth available, the bandwidth allocation unit 113 allocates bandwidth to management message (i.e., the state B66 in FIG. 6) for a third time in Step S57. In Step S57, the bandwidth is allocated to the secondary management message. After Step S57, if no bandwidth is left, Steps S58-S59 are skipped and Step S38 (in FIG. 3) is executed. If there is still bandwidth left, Step S58 is performed to allocate bandwidth to nrtPS (i.e., the state B64 in FIG. 6) for a second time. In Step S58, the bandwidth allocated to each connection of nrtPS cannot exceed the highest threshold data amount.

Finally, if no bandwidth is available, Step S59 skipped and Step S38 (in FIG. 3) is executed. If there is still bandwidth available, the bandwidth allocation unit 113 of the subscriber station 11 performs Step S59 to allocate the remained bandwidth to other packets (i.e., the state B67 in FIG. 6) for example, the packets of "best effort (BE)" service registered in each connection. Usually, the "BE" service includes E-mail service etc. In this way, it is ensured that the subscriber station data transmission has certain QoS, and the wireless network bandwidth can be effectively utilized.

Figure 7:
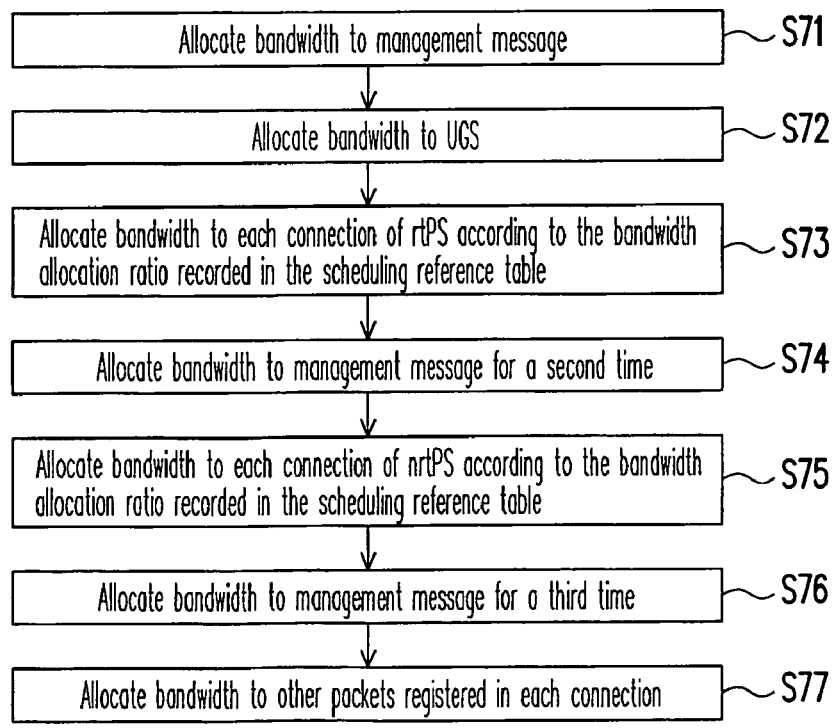
FIG. 7 is a flow chart of a second normal operation mode according to the embodiment of FIG. 4 of the present invention.
Figure 8:
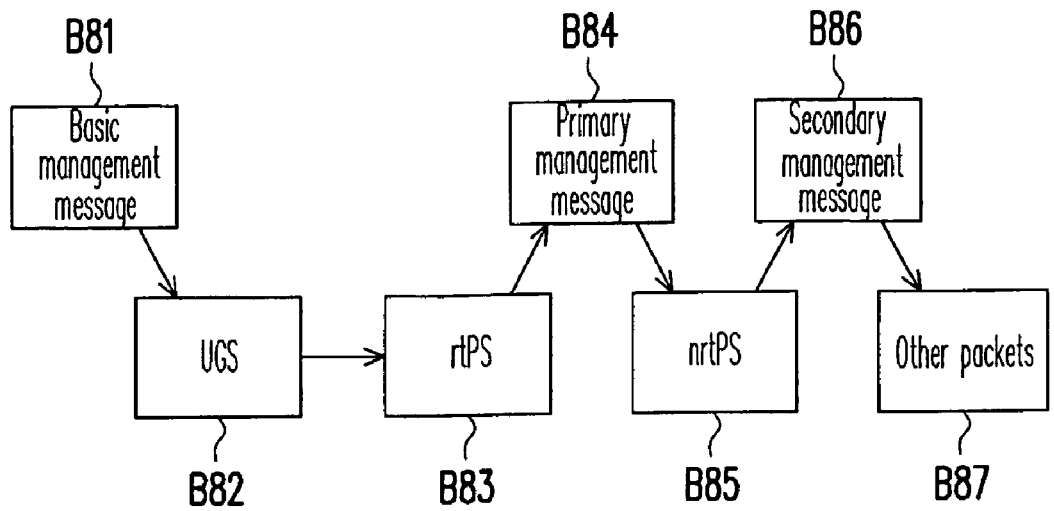
FIG. 8 is a state diagram of bandwidth allocation according to the embodiment of FIG. 7 of the present invention.

FIG. 7 is a detailed flow chart of the second normal operation mode M412 (or Step S372 of FIG. 3) according to the embodiment of FIG. 4 of the present invention. FIG. 8 is a state diagram of bandwidth allocation according to the embodiment in FIG. 7 of the present invention. In this embodiment, the bandwidth allocation unit 113 of the subscriber station 11 dynamically records a scheduling reference table (referring to Table 1) when starts operation, and updates the bandwidth allocation field at any time. The bandwidth allocation field in the scheduling reference table is used to define the bandwidth amount (or bandwidth allocation ratio) to be allocated to each connection.

TABLE 1

Scheduling reference Table

| Connection ID | Bandwidth Allocation Field |
|---|---|
| i | $QoS_{min}(i)/\Sigma QoS_{min}( )$ |
| j | $QoS_{min}(j)/\Sigma QoS_{min}( )$ |
| k | $QoS_{min}(k)/\Sigma QoS_{min}( )$ |

In this embodiment, the subscriber station 11 first calculates bandwidth required by all the management messages (for example, basic management message, primary management message, and secondary management message) in the current frame. Next, the bandwidth allocation unit 113 preserves the bandwidth required for uploading all the management messages in the current frame, so as to ensure all the management messages can be uploaded in real time. After the bandwidth required by the management messages is deducted from the bandwidth provided by the BS, the remained bandwidth is allocated to each connection according to the ratio of the bandwidth allocation field in the scheduling reference table. For example, if the lowest guaranteed data amounts $QoS_{min}(i)$, $QoS_{min}(j)$, $QoS_{min}(k)$ of connection IDs i, j, k are respectively 20, 10, 30, the bandwidth allocation ratio of the connection ID I is $QoS_{min}(i)/\Sigma QoS_{min}( )=20/(20+10+30)=1/3$. Therefore, after the bandwidth required by the management messages is deducted from the bandwidth provided by the BS, 1/3 of the remained bandwidth is allocated to the connection i according to the ratio of the bandwidth allocation field in the scheduling reference table. The bandwidth amount of each connection defined by the bandwidth allocation field must conform to the QoS corresponding to each connection. That is, the bandwidth represented by the bandwidth allocation field must fall between the minimum value and the maximum value of the connection QoS. Therefore, if there is bandwidth for data transmission, an allocation of scheduling will be carried out in the following sequence and the bandwidth allocation field in the scheduling reference table, so as to improve the bandwidth allocation efficiency.

Step S372 includes Steps S71-S77. After the subscriber station 11 switches its operation mode into the second normal operation mode, the bandwidth allocation unit 113 of the subscriber station 11 performs Step S71 to allocate bandwidth to management message (i.e., the state B81 in FIG. 8). The above step only allocates bandwidth to the RNG-REQ message and basic management message, and the primary management message and secondary management message are processed in Step S74 or S76. Next, the bandwidth allocation unit 113 of the subscriber station 11 performs Step S72 to allocate bandwidth to the connection of UGS (i.e., the state B82 in FIG. 8) according to the records of the bandwidth allocation field in the scheduling reference table. Then, the bandwidth allocation unit 113 of the subscriber station 11 performs Step S73 to allocate bandwidth to each connection of rtPS (i.e., the state B83 in FIG. 8) according to the records of the bandwidth allocation field in the scheduling reference table.

Afterwards, the bandwidth allocation unit 113 of the subscriber station 11 performs Step S74 to allocate bandwidth to management message according to the preserved bandwidth records of management message (i.e., the state B84 in FIG. 8) in the bandwidth allocation field in the scheduling reference table for a second time. In the Step S74, the bandwidth is allocated to the primary management message. After Step S74, the bandwidth allocation unit 113 performs Step S75 to allocate bandwidth to each connection of nrtPS (i.e., the state B85 in FIG. 8) according to the bandwidth allocation ratio recorded in the scheduling reference table. Next, the bandwidth allocation unit 113 of the subscriber station 11 performs Step S76 to allocate bandwidth to management message according to the preserved bandwidth records of management message (i.e., the state B86 in FIG. 8) in the bandwidth allocation field in the scheduling reference table for a third time. In Step S76, the bandwidth is allocated to the secondary management message. Finally, the bandwidth allocation unit 113 performs Step S77 to allocate bandwidth to other packets (i.e., the state B87 in FIG. 8), for example, the packets of BE service registered in each connection according to the records of the bandwidth allocation field in the scheduling reference table. In this way, the bandwidth can be granted to each connection at a time, so as to improve the efficiency of bandwidth allocation. Meanwhile, certain QoS of data transmission of subscriber station can be ensured and the wireless network bandwidth can be effectively utilized. In other words, in this operation mode, the above proportional allocation method can provide the BE service with a guaranteed time period of transmission.

For example, it is assumed that the bandwidth amount is 230, and the basic management message, primary management message, secondary management message respectively need 10 bandwidths. The lowest guaranteed data amounts for UGS, rtPS, nrtPS, BE service are 20, 30, 40, 10 bandwidths respectively. After calculation, the subscriber station 11 will allocate 30 bandwidths in total to each management message. In the bandwidth allocation field of the scheduling reference table, the bandwidth allocation ratios of UGS, rtPS, nrtPS, BE service are 20%, 30%, 40%, 10% respectively. After allocating 30 bandwidths in total to each management message, the remained 200 bandwidths will be allocated to each connection of UGS, rtPS, nrtPS, BE service according to the bandwidth allocation ratios in the scheduling reference table. Thus, UGS, rtPS, nrtPS, BE service can acquire 40, 60, 80, 20 bandwidths respectively. After allocating 30 bandwidths in total to each management message, the remained bandwidth is insufficient to satisfy the lowest guaranteed data amount of each connection for a certain period of time. At this time, the subscriber station 11 switches its operation mode into the management mode (referring to Step S373).

Figure 9:
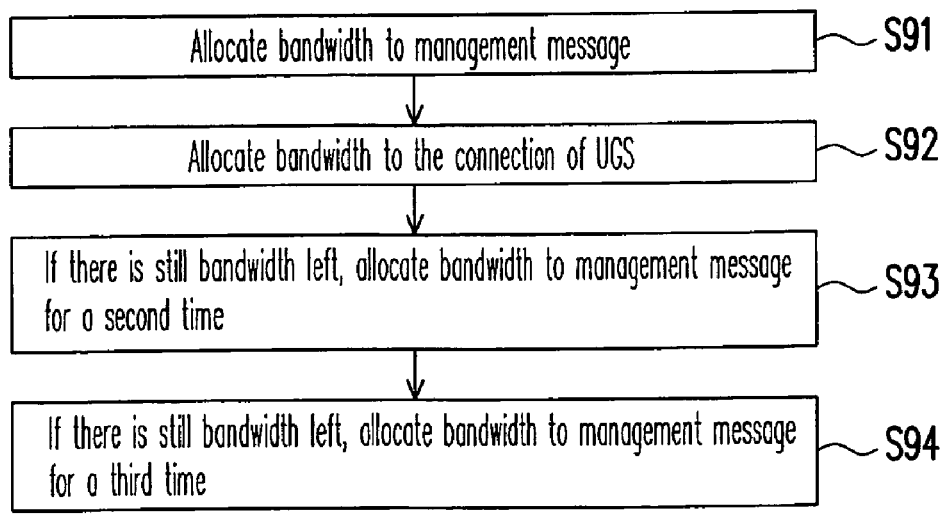
FIG. 9 is a flow chart of a management operation mode according to the embodiment of FIG. 4 of the present invention.
Figure 10:
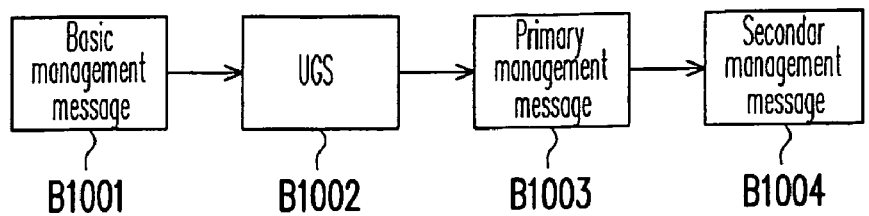
FIG. 10 is a state diagram of bandwidth allocation according to the embodiment of FIG. 9 of the present invention.

FIG. 9 is a detailed flow chart of the management operation mode M42 (or Step S373 of FIG. 3) according to the embodiment of FIG. 4 of the present invention. FIG. 10 is a state diagram of bandwidth allocation according to the embodiment in FIG. 9 of the present invention. Step S373 includes Steps S91-S94. After the subscriber station 11 switches its operation mode into the management operation mode, the bandwidth allocation unit 113 of the subscriber station 11 performs Step S91 to allocate bandwidth to management message (i.e., the state B1001 in FIG. 10). The above step only allocates bandwidth to the RNG-REQ message and basic management message, and the primary management message and secondary management message are processed in Step S93 or S94. Next, the bandwidth allocation unit 113 of the subscriber station 11 performs Step S92 to allocate bandwidth to the connection of UGS (i.e., the state B1002 in FIG. 10) to satisfy the lowest guaranteed data amount. It should be specially noted that the lowest guaranteed data amount and the highest threshold data amount in UGS are defined in the same way.

After Step S92, if no bandwidth is available, Steps S93-S94 are skipped and Step S38 (in FIG. 3) is executed, i.e., burst the ready data packets to the BS 12. If there is still bandwidth available, the bandwidth allocation unit 113 of the subscriber station 11 performs Step S93 to allocate bandwidth to management message (i.e., the state B1003 in FIG. 10) for a second time. In Step S93, the bandwidth is allocated to the primary management message. After Step S93, if no bandwidth is left, Step S94 is skipped and Step S38 (in FIG. 3) is executed. If there is still bandwidth available, the subscriber station performs Step S94 to allocate the remained bandwidth to management message (i.e., the state B1004 in FIG. 10) for a third time. In Step S94, the bandwidth is allocated to other management messages, for example, the secondary management messages that are not processed in Steps S91 and S93. Under the wireless network environment that the wireless signal quality is good but the bandwidth allocated by the BS 12 to the subscriber station 11 is insufficient, or when the subscriber station 11 hands over the BS, the subscriber station 11 can switch into the management operation mode to transmit management message and voice message, thus saving wireless resources.

In the description of the embodiment in FIG. 4, the management operation mode M42 can be further divided into the first management operation mode M421 and the second management operation mode M422, and the two management operation modes are different in terms of the manner of processing to the data packets of each connection. Referring to FIGS. 1, 4, and 9 together, the subscriber station 11 switches its operation mode into the management operation mode M42, indicating that though the signal quality is good, but the bandwidth that can be allocated by the BS 12 does not meet the requirements, or the subscriber station 11 needs to hand over the BS 12. Thus, the subscriber station 11 must choose to register or discard the SDU of the upper-layer unit 10 in the SDU buffer 111. When the subscriber station 11 needs to hand over the BS 12, the subscriber station 11 switches into the first management operation mode M421 to register the SDU output by the upper-layer unit 10. After the subscriber station 11 hands over the BS, the subscriber station 11 switches back to the normal operation mode M411 or M412 (referring to Step S36, depending on the value of A/B), so as to transmit the originally registered data to a new BS.

When the bandwidth that can be allocated by the BS 12 does not meet the requirements, the subscriber station 11 enters the second management operation mode M422 to selectively discard the SDU output by the upper-layer unit 10. For example, for UGS and rtPS that have high real-time requirement and low integrity requirement, a first in first out (FIFO) drop method can be employed to ensure the subscriber station to receive the latest data packets. As for nrtPS and BE service that have low real-time requirement and high integrity requirement, a last in first out (LIFO) drop method can be employed to ensure the subscriber station to receive an integral message. Or, the data packets output by the upper-layer unit of low priority can be directly discarded.

Figure 11:
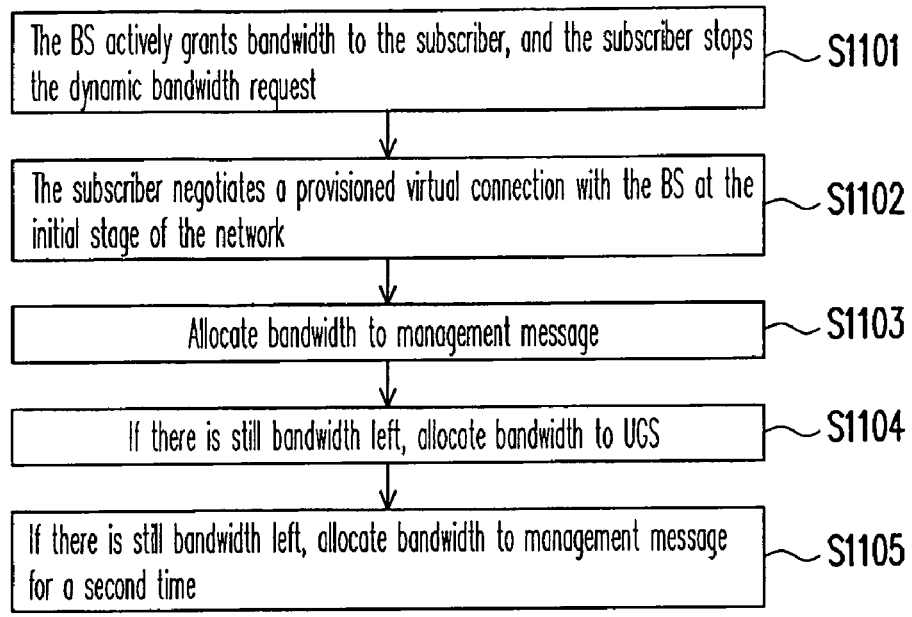
FIG. 11 is a flow chart of an emergency operation mode according to the embodiment of FIG. 4 of the present invention.
Figure 12:
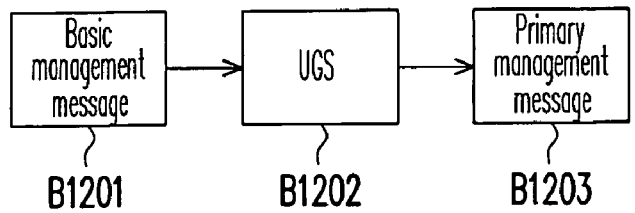
FIG. 12 is a state diagram of bandwidth allocation according to the embodiment of FIG. 11 of the present invention.

FIG. 11 is a detailed flow chart of the emergency operation mode M43 (or Step S374 of FIG. 3) according to the embodiment in FIG. 4 of the present invention. FIG. 12 is a state diagram of bandwidth allocation according to the embodiment in FIG. 11 of the present invention. Step S374 includes Steps S1101-S1105. When the wireless signal quality is intolerable, the subscriber station 11 switches its operation mode into the emergency operation mode. As it is impossible to estimate when the degradation of the wireless signal quality can be overcome, the subscriber station 11 will stop providing services to most of connections. In the emergency operation mode, the BS 12 actively grants bandwidth to the subscriber station 11, and the subscriber station 11 stops the dynamic bandwidth request (Step S1101). At this time, the subscriber station 11 negotiates a provisioned virtual connection with the BS 12 at the initial stage of the network (Step S1102). The bandwidth allocation unit 113 of the subscriber station 11 performs Step S1103 to allocate the bandwidth actively granted by the BS to the RNG-REQ message and basic management message (i.e., the state B1201 in FIG. 12), and the primary management message is processed in Step S1105. That is, the operation mode is especially responsible for allocating bandwidth to the basic management message, and if there is still bandwidth left, allocating the bandwidth to other management messages and UGS. Before performing Step S1104, the bandwidth allocation unit 113 of the subscriber station 11 must clarify whether there is bandwidth. If no bandwidth is left, Steps S1104-S1105 are skipped and Step S38 (in FIG. 3) is executed, i.e., burst the ready management message packets to the BS 12. If there is still bandwidth left, the bandwidth allocation unit 113 performs Step S1104 to allocate bandwidth to UGS (i.e., the state B1202 in FIG. 12). After Step S1104, if no bandwidth is left, Step S1105 is skipped and Step S38 (in FIG. 3) is executed, i.e., burst the ready data packets to the BS 12. If there is still bandwidth left, the bandwidth allocation unit 113 of the subscriber station 11 performs Step S1105, i.e., allocates bandwidth to management message (i.e., the state B1203 in FIG. 12) for a second time. In Step S1105, the bandwidth is allocated to the primary management message. Under the currently deteriorated wireless network environment, the emergency operation mode M43 can transmit the most basic management messages (i.e., the basic management message and primary management message) and UGS, thus saving wireless resources to the utmost.

It should be noted that, in the above operation modes, after the subscriber station 11 allocates bandwidth to each service, various manufacturers have different designs on the details of the scheduling for different connections in each service. Examples are given below.

Figure 13:
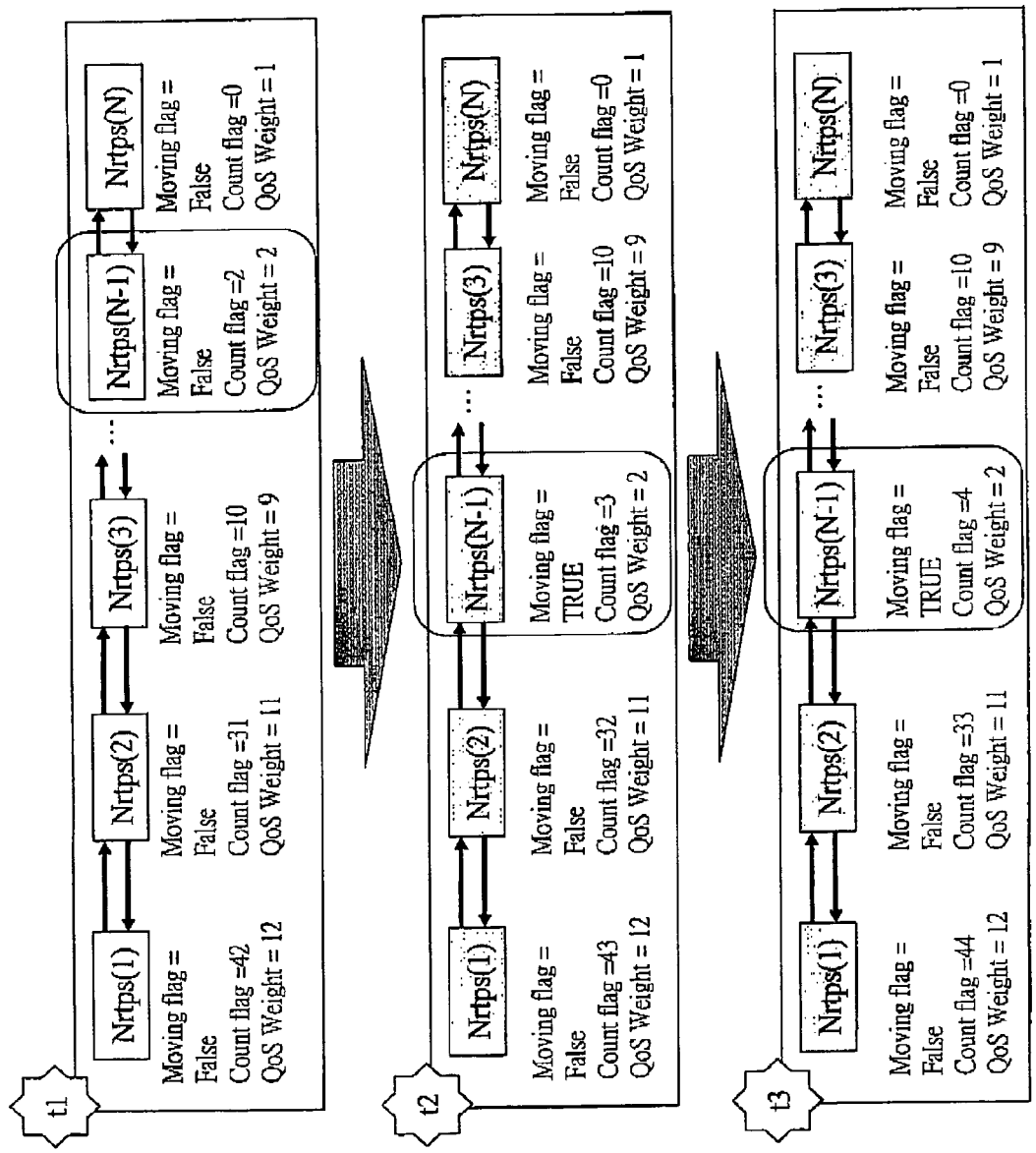
FIG. 13 is a connection scheduling diagram of nrtPS according to an embodiment of the present invention.

FIG. 13 is a connection scheduling diagram of nrtPS according to an embodiment of the present invention. Initially, the subscriber station 11 orders the connections in an order according to the lowest guaranteed data amount of QoS (referred to as QoS weight) required by each connection, and allocates bandwidth sequentially from the connection Nrtps (1) to Nrtps(N). At first, a count flag of each connection is 0. If a connection is allocated with bandwidth, the count flag is added with 1. After a period of time, each connection will have a different count flag value. In one frame, the bandwidth allocation unit 113 allocates bandwidth to each connection sequentially according to the QoS weight. Thus, the connections of a low QoS weight usually cannot obtain bandwidth in the current frame, and must wait for being allocated with bandwidth in the next frame (probably, the connections still cannot obtain bandwidth). In order to make the connections of a low QoS weight to be allocated with bandwidth, the subscriber station 11 exchanges the order of the connections with the count flag smaller than a preset lower limit value (for example, count flag <3) and the order of the connections with an earlier sequence number (having a higher QoS weight). Further, in order to ensure the connections of a high QoS weight to be allocated with sufficient bandwidth, the subscriber station 11 can permanently grant connections of a QoS weight higher than a preset value (for example, QoS weight>10) with a higher sequence, thus avoiding being affected by the sequence-exchange mechanism.

For example, as shown in FIG. 13, in the interval of t1-t3, due to QoS weight>10, the connections Nrtps(1) and Nrtps(2) are both permanently granted with a higher sequence by the subscriber station 11 (sequences of other connections are not altered). As the count flag of the connection Nrtps(N-1) with a lower QoS weight is 2 (smaller than 3), the subscriber station 11 exchanges the sequence of the connection Nrtps (N-1) with the connection Nrtps(3) (QoS weight<10, count flag>3). After exchanging the sequence, the moving flag of the connection Nrtps(N-1) is set as True to prevent the connection Nrtps(N-1) exchanging sequence with other connections again. Definitely, in order to avoid the above sequence exchange mechanism permanently affecting the sequence of the subscriber station 11 based on the QoS weight, the subscriber station 11 resets (re-aggregates the count flag, the moving flag, and re-orders based on the QoS weight) every other preset interval (for example, 1 hour).

Figure 14:
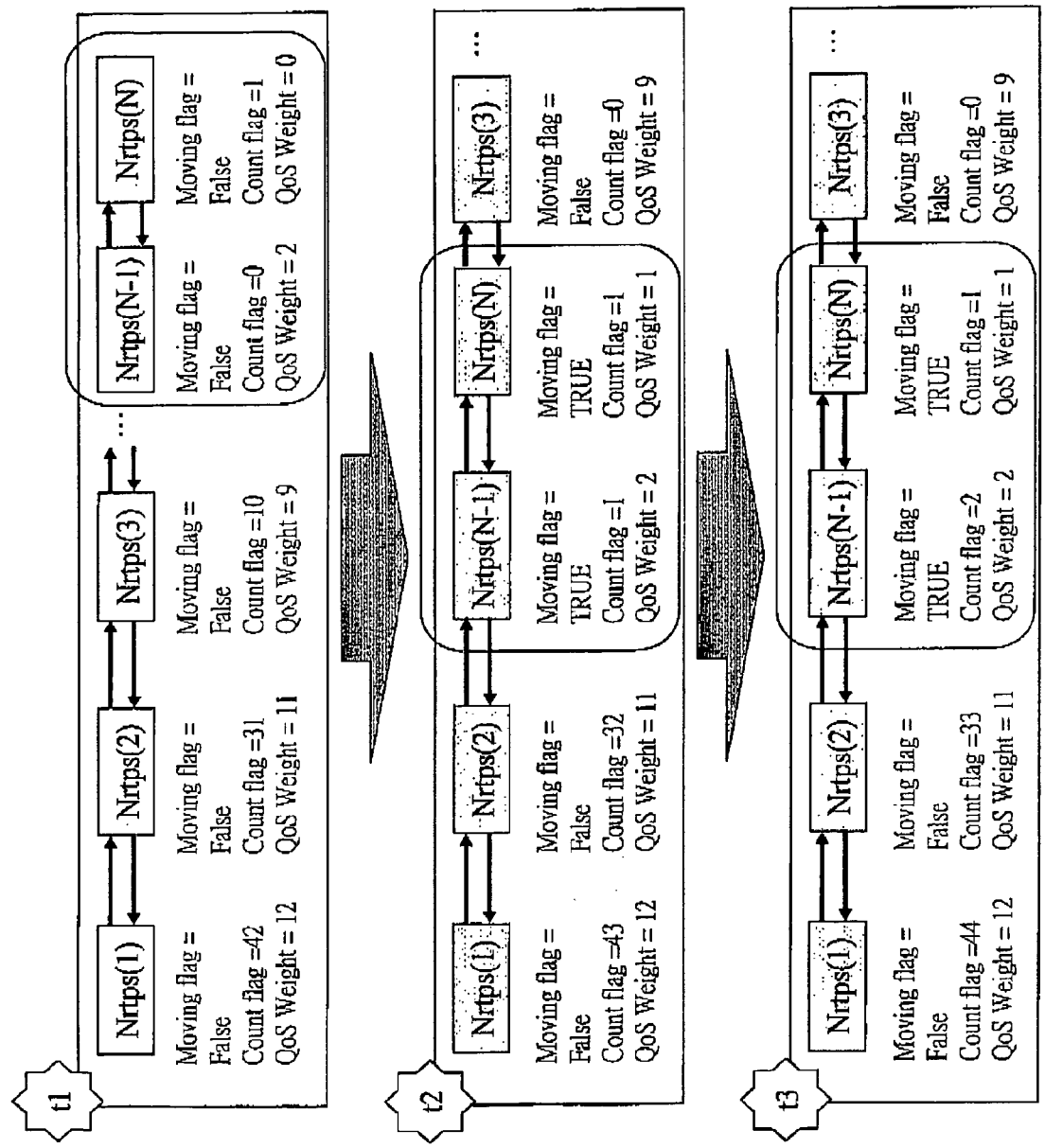
FIG. 14 is another connection scheduling diagram of nrtPS according to an embodiment of the present invention.

Selecting one or more connections from those with the count flag smaller than a preset lower limit value, and the implementation manner is not limited to the above examples. There are many other design methods for the scheduling of different connections in each service, and an example is further provided, as shown in FIG. 14. FIG. 14 is another connection scheduling diagram of nrtPS according to an embodiment of the present invention. Compared with FIG. 13, the subscriber station 11 in FIG. 14 inserts the connections Nrtps (N-1) and Nrtps(N) with the count flag of 0 into the sequence of the connections Nrtps(2) and Nrtps(3), so as to ensure that the connections with the count flag of 0, such as Nrtps(N-1) and Nrtps(N), can be allocated with bandwidth. Those of ordinary skill in the art can also design the subscriber station 11 to order out of order. For example, except the connections Nrtps(1) and Nrtps(2), the connections Nrtps(3)-Nrtps(N) can be ordered randomly in priority. The connections can be ordered in many ways, which differ based on the design. Those of ordinary skill in the art can determine according to parameters such as the employed communication system, communication protocol, and usage environment of communication, which will not be described herein.

Figure 15:
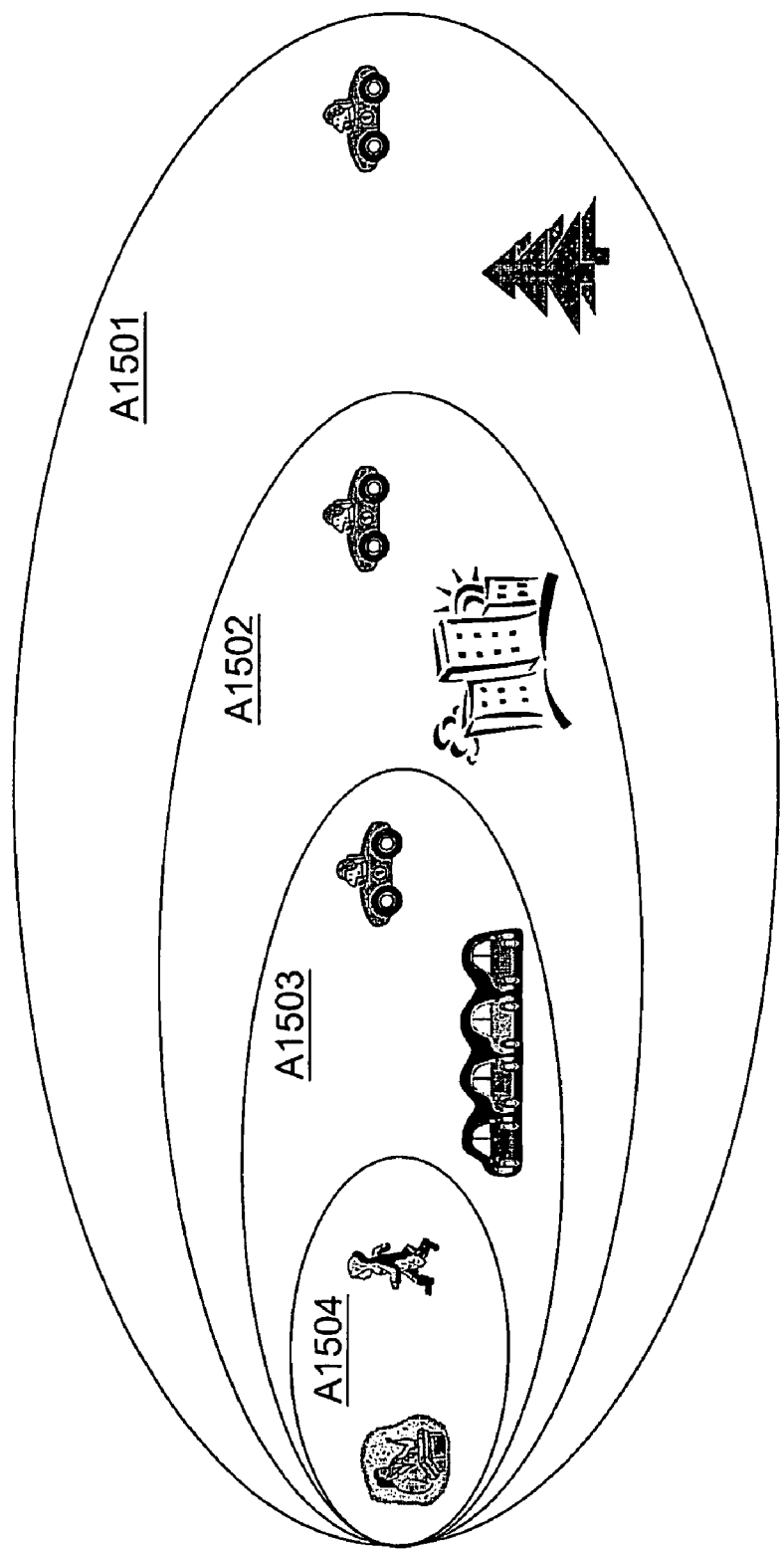
FIG. 15 shows a simulation environment for the application of the embodiment of the present invention.

FIG. 15 shows a simulation environment of the application of the embodiment of the present invention. According to the background, a group of scholars attending a grand indoor activity take a car equipped with a WiMAX system SS/local station device (subscriber station) from suburb to downtown, and the car has registered SS/local station with the network service provider. During calling upon booting up, the subscriber station has established at least one virtual service connection, and the connection can set grant parameters of unsolicited connection bandwidth.

At first, the car drives in the suburb area A1501. At this time, the BS serving in this suburb area A1501 does not transmit a large amount of data at that time, and nobody uploads or downloads a large amount of data within a short period of time. Thus, the proportion of the bursty data (including rtPS and nrtPS data) uploaded by the subscriber station in a frame to the non-management message data is lower than 60%, the bandwidth data derived by the signal measurement shows the wireless signal quality is good, and the subscriber station in service negotiation system switches its operation mode into the second normal operation mode. At this time, after ensuring the subscriber station has sufficient QoS, the subscriber station can allocate bandwidth according to the scheduling reference table, so as to improve the scheduling efficiency.

Next, the car drives in the downtown area A1502, and those in the car use the network video phone to communicate with their friends. At this time, the proportion of the bursty data to the non-management message data exceeds 60%, so the bandwidth allocation unit 113 switches into the first normal operation mode. Then, it becomes difficult for the subscriber station to estimate the characteristics of the bursty data and making schedule, so it is determined whether or not to satisfy the maximum bandwidth request of rtPS and nrtPS depending on the usage situation of the bandwidth, so as to ensure each connection and management message have sufficient QoS and the wireless network bandwidth can be effectively utilized.

Afterwards, the car drives into the parking lot (the area A1503) near the assembly place. As there are a large number of subscriber stations in the area A1503 crowded, the BS serving in the area A1503 cannot satisfy the request of each subscriber station. That is, the wireless network resources at this moment are insufficient, and the bandwidth becomes insufficient, so the subscriber station enters the management operation mode. The subscriber station may find that except UGS such as voice connection and the most basic management message such as emergency call, the connections of the rest of the subscriber station data flow may not be established.

Finally, the scholars enter the place (the area A1504) for the grand activity. At this time, as an excessive number of the subscriber stations are located in the area, the total bandwidth required by the quality service has exceeded the bandwidth that can be provided by the network station/BS, and the signal quality is beyond the tolerable range. Thus, the subscriber station switches into the emergency operation mode. Regardless of how many connections are established by the SS/local station device, whether the SS/local station is scheduled to serve as a transmission station is based on the bandwidth grant action of the BS, for example, the time interval of bandwidth grant. The SS/local station does not perform the action of bandwidth request, so the data transmission is not ensured. Only the basic management message is scheduled in priority, and whether the UGS is scheduled depends on the bandwidth, thereby saving the bandwidth at the utmost.

In view of the above, according to an embodiment of the present invention, Step S21 is adopted to gather statistics of the bursty data. In Step S22, the wireless signal quality is measured. In Step S23, the operation mode is switched according to the statistics and bandwidth data derived by the signal measurement. In step S24, the bandwidth is allocated to management message and numbers of connections to satisfy the QoS of each connection when the subscriber station in the service negotiation system switches its operation mode into a normal operation mode. In Step S25, the bandwidth is allocated to management message and UGS when the subscriber station in the service negotiation system switches into an emergency operation mode. Thus, the QoS parameter/service scheduling parameters provided by the service negotiation system according to the present invention takes the actual subscriber station's environment into consideration, thereby ensuring certain QoS of subscriber station data transmission, effectively utilizing wireless network bandwidth, and transmitting UGS or the most basic management messages under an undesirable or already deteriorated wireless network environment, thus saving wireless resources.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A resource allocation method of a subscriber station in a service negotiation system applied to a wireless network, comprising:
    gathering statistics of bursty data;
    measuring wireless signal quality to obtain a signal measurement;
    switching an operation mode according to the statistics of bursty data and the measuring result;
    allocating available uplink bandwidth to management message and a plurality of connections to satisfy a requirement of quality of service (QoS) for each connection when the subscriber station in the service negotiation system switches its operation mode to a normal operation mode; and
    allocating a granted bandwidth to the management message and unsolicited grant service (UGS) when the subscriber station in the service negotiation system switches its operation mode to an emergency operation mode, wherein a process of bandwidth granting comprises unsolicited bandwidth grant and a mechanism for the subscriber station to stop dynamic bandwidth request, which is configured and determined at a network initialization stage of the subscriber station.

2. The resource allocation method of the subscriber station within the service negotiation system as claimed in claim 1, wherein the step of gathering statistics of bursty data comprises:
    calculating data of real-time polling service (rtPS) and non-real-time polling service (nrtPS) uploaded by the subscriber station in a frame;
    calculating data of non-management message uploaded by the subscriber station in the frame; and
    calculating continuous historical records of a proportion of rtPS and nrtPS traffic to the non-management message data.

3. The resource allocation method of the subscriber station in the service negotiation system as claimed in claim 2, wherein at the moment that the proportion of rtPS and nrtPS traffic to that of the non-management message data exceeds a threshold value, the subscriber station in the service negotiation system switch its operation mode into a normal operation mode, and the normal operation mode comprises:
    allocating bandwidth to management message;
    allocating bandwidth to UGS;
    allocating bandwidth to each rtPS connection to satisfy its lowest guaranteed requirement; and
    allocating bandwidth to each nrtPS connection to satisfy its lowest guaranteed requirement.

4. The resource allocation method of the subscriber station in the service negotiation system as claimed in claim 3, wherein the normal operation mode further comprises:
    allocating bandwidth to management message for a second time; and
    allocating bandwidth to rtPS for a second time to satisfy a highest threshold data amount of rtPS in each connection.

5. The resource allocation method of the subscriber station in the service negotiation system as claimed in claim 4, wherein the normal operation mode further comprises:
    allocating bandwidth to management message for a third time;
    allocating bandwidth to nrtPS for a second time to satisfy a highest threshold data amount of nrtPS in each connection; and
    allocating bandwidth to other packets registered in each connection.

6. The resource allocation method of the subscriber station in the service negotiation system as claimed in claim 2, further comprising:
    setting up an scheduling reference table, wherein the scheduling reference table includes scheduling records of a bandwidth allocation ratio; and
    updating the scheduling reference table according to QoS parameters of each connection and an uploaded data amount of each connection during an operation of the subscriber station.

7. The resource allocation method of the subscriber station in the service negotiation system as claimed in claim 6, wherein when a proportion of data of rtPS and nrtPS uploaded by the subscriber station in a frame to the non-management message data is below a preset value, and a bandwidth data derived by the signal measurement shows the wireless signal quality is within a tolerable range, the subscriber station in the service negotiation system switches its operation mode into a normal operation mode, and the normal operation mode comprises:
    allocating bandwidth to management message;
    allocating bandwidth to UGS; and
    allocating bandwidth to each connection of rtPS, according to the bandwidth allocation ratio recorded in the scheduling reference table.

8. The resource allocation method of the subscriber station in the service negotiation system as claimed in claim 7, wherein the normal operation mode further comprises:
    allocating bandwidth to management message for a second time;
    allocating bandwidth to each connection of nrtPS according to the bandwidth allocation ratio recorded in the scheduling reference table;
    allocating bandwidth to management message for a third time; and
    allocating bandwidth to other packets registered in each connection.

9. The resource allocation method of the subscriber station in the service negotiation system as claimed in claim 2, wherein if a target base station that the subscriber station connects to during a hand over procedure can only provide unacceptable services or can only grant insufficient bandwidth to satisfy requirements of the subscriber station, or the subscriber station can only function on basic protocol requirements, the subscriber station of the service negotiation system will switch its operation mode into a management operation mode, and the management operation mode comprises:
  allocating bandwidth to management message;
  allocating bandwidth to UGS;
  allocating bandwidth to the management message for a second time if there is still bandwidth left at that time; and
  allocating bandwidth to the management message for a third time if there is still bandwidth left at that time.

10. The resource allocation method of the subscriber station in the service negotiation system as claimed in claim 9, wherein the management operation mode further comprises:
  registering data packets output by an upper-layer unit.

11. The resource allocation method of the subscriber station in the service negotiation system as claimed in claim 9, wherein the management operation mode further comprises:
  directly discarding data packets output by the upper-layer unit of low priority.

12. The resource allocation method of the subscriber station in the service negotiation system as claimed in claim 2, wherein when the bandwidth data derived by the signal measurement shows that a wireless signal quality exceeds a tolerable range, the subscriber station in the service negotiation system switches its operation mode into an emergency operation mode, and the emergency operation mode comprises:
  a base station (BS) actively granting bandwidth to the subscriber station, and the subscriber station stopping the dynamic bandwidth request;
  the subscriber station negotiating a provisioned virtual connection with the BS at an initial stage of the network;
  allocating an active grant bandwidth to management message;
  allocating bandwidth to UGS when there is still bandwidth left; and
  allocating bandwidth to the management message for a second time when there is still bandwidth left.

13. The resource allocation method of the subscriber station in the service negotiation system as claimed in claim 12, wherein the method of actively granting bandwidth comprises:
  establishing a subscriber station-defined connection with the BS after the subscriber station completes the stage of network entry, wherein the subscriber station-defined connection is accepted by the BS, wherein parameters of the subscriber station-defined connection comprise at least an active grant bandwidth granularity and an active grant bandwidth value; and
  altering the parameters of the subscriber station-defined connection according to connection settings of UGS before entering the emergency mode.

14. The resource allocation method of the subscriber station in the service negotiation system as claimed in claim 13, wherein when the BS intends to suspend or break the subscriber station-defined connection, the subscriber station immediately generates another subscriber station-defined connection having the same parameter value and range as an original active grant connection through contention-based bandwidth request and re-establishing connection.

15. The resource allocation method of the subscriber station of the service negotiation system as claimed in claim 14, wherein in the emergency mode, a connection transmission permitted by the subscriber station depends on an active grant bandwidth transmission, and the dynamic bandwidth request mechanism of each connection is stopped.

16. A subscriber station in a service negotiation system, comprising:
  a media access control (MAC) manager, for outputting at least one management message;
  a service data unit (SDU) buffer, for registering an output of an upper-layer unit and the MAC manager;
  an MAP decoder, for receiving and decoding an MAP from a base station (BS);
  a bandwidth allocation unit, coupled to the MAP decoder, for allocating bandwidth to each connection according to the decoding result of the MAP;
  a protocol data unit (PDU) constructor, coupled to the bandwidth allocation unit and the SDU buffer, for reading management message and data of each connection from the SDU buffer to establish a PDU according to the bandwidth allocation result of each connection;
  a burst interface, coupled to the PDU constructor, for registering the PDU output by the PDU constructor and outputting the registered content during an allocated time; and
  a modulation/demodulation unit, coupled to the burst interface and the MAP decoder, for providing a signal modulation/demodulation interface between the subscriber station and the BS, and modulating the output data of the burst interface and transmitting it to the BS;
  wherein the subscriber station further gathers statistics of bursty data and measures wireless signal quality, and the bandwidth allocation unit switches its operation mode according to the statistics and bandwidth data derived by a signal measurement;
  wherein when the subscriber station switches its operation mode into a normal operation mode, the bandwidth allocation unit allocates bandwidth to management message and numbers of connections to satisfy a QoS of each connection; and
  wherein when the subscriber station switches its operation mode into an emergency operation mode, the bandwidth allocation unit allocates bandwidth to management message and UGS.

17. The subscriber station in the service negotiation system as claimed in claim 16, wherein the bandwidth allocation unit calculates data of rtPS and nrtPS uploaded by the subscriber station in a frame, calculates data of the non-management message uploaded by the subscriber station in a frame, and calculates continuous historical record value of proportion of the data of rtPS and nrtPS to the non-management message data.

18. The subscriber station in the service negotiation system as claimed in claim 17, wherein when the proportion of data of rtPS and nrtPS to the non-management message data exceeds a preset value, the bandwidth allocation unit switches its operation mode into a normal operation mode, and the normal operation mode comprises:
  allocating bandwidth to management message;
  allocating bandwidth to UGS;
  allocating bandwidth to each connection of rtPS to satisfy a lowest guaranteed data amount of rtPS in each connection; and
  allocating bandwidth to each connection of nrtPS to satisfy a lowest guaranteed data amount of nrtPS in each connection.

19. The subscriber station in the service negotiation system as claimed in claim 18 wherein the normal operation mode of the bandwidth allocation unit further comprises:
  allocating bandwidth to management message for a second time; and
  allocating bandwidth to rtPS for a second time to satisfy a highest threshold data amount of rtPS in each connection.

20. The subscriber station in the service negotiation system as claimed in claim 19, wherein the normal operation mode of the bandwidth allocation unit further comprises:
- allocating bandwidth to management message for a third time;
- allocating bandwidth to nrtPS for a second time to satisfy a highest threshold data amount of nrtPS in each connection; and
- allocating bandwidth to other packets registered in each connection.

21. The subscriber station in the service negotiation system as claimed in claim 16, wherein the bandwidth allocation unit further creates a scheduling reference table in which a bandwidth allocation ratio of each connection is recorded; and the bandwidth allocation unit updates the scheduling reference table according to the QoS parameter of each connection and an uploaded data amount of each connection during the operation of the subscriber station.

22. The subscriber station in the service negotiation system as claimed in claim 21, wherein when proportion of data of rtPS and nrtPS uploaded by the subscriber station in a frame to the non-management message data is below a preset value, and the bandwidth data derived by the signal measurement shows the bandwidth grant proportion and the wireless signal quality are within a tolerable range, the bandwidth allocation unit switches its operation mode into a normal operation mode, and the normal operation mode comprises:
- allocating bandwidth to management message;
- allocating bandwidth to UGS; and
- allocating bandwidth to each connection of rtPS according to the bandwidth allocation ratio recorded in the scheduling reference table.

23. The subscriber station in the service negotiation system as claimed in claim 22, wherein the normal operation mode of the bandwidth allocation unit further comprises:
- allocating bandwidth to management message for a second time;
- allocating bandwidth to each connection of nrtPS according to the bandwidth allocation ratio recorded in the scheduling reference table;
- allocating bandwidth to management message for a third time; and
- allocating bandwidth to other packets registered in each connection.

24. The subscriber station in the service negotiation system as claimed in claim 16, wherein if a target base station (BS) that the subscriber station connects to during a hand over procedure can only provide unacceptable services or can only grant insufficient bandwidth to satisfy requirements of the subscriber station, or the subscriber station can only function on basic protocol requirements, the subscriber station in service negotiation system switches its operation mode into a management operation mode, and the management operation mode comprises:
- allocating bandwidth to management message;
- allocating bandwidth to UGS;
- allocating bandwidth to management message for a second time when there is still bandwidth left; and
- allocating bandwidth to management message for a third time when there is still bandwidth left.

25. The subscriber station in the service negotiation system as claimed in claim 16, wherein when the bandwidth data derived by the signal measurement shows the wireless signal quality exceeds a tolerable range, the bandwidth allocation unit switches its operation mode into an emergency operation mode, and the emergency operation mode comprises:
- allocating bandwidth to management message;
- allocating bandwidth to UGS when there is still bandwidth left; and
- allocating bandwidth to management message for a second time when there is still bandwidth left.

\* \* \* \* \*